(12) United States Patent
Zhang et al.

(10) Patent No.: US 11,470,487 B2
(45) Date of Patent: Oct. 11, 2022

(54) USER EQUIPMENT AND METHOD THEREOF

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 66 days.

(21) Appl. No.: 17/052,781

(22) PCT Filed: May 10, 2019

(86) PCT No.: PCT/JP2019/018758
§ 371 (c)(1),
(2) Date: Nov. 3, 2020

(87) PCT Pub. No.: WO2019/216418
PCT Pub. Date: Nov. 14, 2019

(65) Prior Publication Data
US 2021/0235292 A1    Jul. 29, 2021

(30) Foreign Application Priority Data

May 10, 2018   (CN) .......................... 201810445554.0

(51) Int. Cl.
*H04W 24/04*   (2009.01)
*H04W 76/28*   (2018.01)
(Continued)

(52) U.S. Cl.
CPC .......... *H04W 24/04* (2013.01); *H04L 5/0048* (2013.01); *H04W 24/10* (2013.01); *H04W 52/0248* (2013.01); *H04W 76/28* (2018.02)

(58) Field of Classification Search
CPC combination set(s) only.
See application file for complete search history.

(56) References Cited

U.S. PATENT DOCUMENTS

2015/0351028 A1* 12/2015 Vallath ................ H04L 65/1104
                                                                370/311
2019/0173740 A1*  6/2019 Zhang ................. H04L 41/0668
(Continued)

FOREIGN PATENT DOCUMENTS

WO   2019/159004 A1   8/2019
WO   2020/007037 A1   1/2020
WO   2020/041366 A1   2/2020

OTHER PUBLICATIONS

Ericsson, "Remaining issues for radio link monitoring", R1-1805223 3GPP TSG RAN WG1 Meeting #92bis, Sanya, China, Apr. 16-20, 2018.
(Continued)

*Primary Examiner* — Fahmida S Chowdhury
(74) *Attorney, Agent, or Firm* — ScienBiziP, P.C.

(57) ABSTRACT

The present invention provides a link evaluation method in user equipment and user equipment. The user equipment has a discontinuous reception (DRX) mode and a non-DRX mode. The link evaluation method comprises: measuring a reference signal in an evaluation period; and in the case that a measurement result is lower than a preset threshold, judging that a beam failure instance (BFI) is generated, and notifying a higher layer of the BFI at an interval of an indication period, wherein when the user equipment is in the non-DRX mode, the duration of the evaluation period is first duration; when the user equipment is in the DRX mode, the duration of the evaluation period is second duration; and the second duration is greater than the first duration.

6 Claims, 2 Drawing Sheets

(51) Int. Cl.
*H04L 5/00* (2006.01)
*H04W 24/10* (2009.01)
*H04W 52/02* (2009.01)

(56) References Cited

U.S. PATENT DOCUMENTS

2019/0200248 A1* 6/2019 Basu Mallick ...... H04B 7/0695
2019/0215896 A1* 7/2019 Zhou ................... H04B 7/0695
2021/0099216 A1* 4/2021 Takeda ................. H04B 7/088

OTHER PUBLICATIONS

Nokia, Nokia Shanghai Bell, "Discussion on RLM evaluation period", R4-1713105, 3GPP TSG-RAN WG4#85, Reno, US, Nov. 27-Dec. 1, 2017.
Huawei, Hisilicon, "CR on TS38.133 for beam failure detection requirements", R4-1804791, 3GPP TSG-RAN WG4 Meeting #86bis, Melbourne, Australia, Apr. 16-20, 2018.
NTT DOCOMO, "New SID Proposal: Study on New Radio Access Technology", RP-160671, 3GPP TSG RAN Meeting #71, Göteborg, Sweden, Mar. 7-10, 2016.

* cited by examiner

USER EQUIPMENT AND METHOD THEREOF

TECHNICAL FIELD

The present invention relates to the field of wireless communications technologies. More specifically, the present invention relates to a link evaluation method in user equipment related to discontinuous reception, a corresponding base station, and corresponding user equipment.

BACKGROUND ART

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the 3rd Generation Partnership Project (3GPP) RAN #64 plenary meeting held in March 2016, a research subject on new 5G radio access technology was proposed (see non-patent literature: RP-160671 New SID Proposal: Study on New Radio Access Technology). In the description of the work item, the operating frequency band of future new communication RATs can be expanded to 100 GHz, which will satisfy at least the demand for enhanced mobile broadband services, the demand for communication between massive Internet of Things terminals, the demand for services with high reliability requirements, and so on. The research work of the item is expected to end in 2018.

Discontinuous reception (DRX) refers to that when UE is not busy in service, instead of continuously monitoring a PDCCH, the UE may wake up periodically and continuously monitor the PDCCH for a period of time, and if scheduling of the UE is not received in this period of time, the UE will no longer monitor the PDCCH until the next wake-up moment.

In order to enable the UE to operate in a high frequency band in a better way, NR adopts a beamforming technology through which emission energy is concentrated and signal quality is improved. In order to ensure signal quality during transmission, the UE needs to evaluate link quality according to a measurement result and indicate the measurement result to a higher layer to realize a link reconfiguration process.

The DRX allows the UE to not continuously monitor a PDCCH so as to achieve an energy saving effect, but the link reconfiguration process requires the UE to receive a measurement signal to measure link quality, and if necessary, indicate a beam failure instance (BFI) to the higher layer to perform beam failure detection. Therefore, how to perform link quality measurement to assist in beam failure detection while achieving energy saving in a DRX mode is a problem to be solved.

Besides, in the beam failure detection process, when the number of BFIs received by the higher layer reaches a threshold, in order to recover the link, the UE will start a beam failure recovery process. This process may occur in ACTIVE time and non-ACTIVE time of the UE in the DRX mode. When the beam failure recovery process occurs, the UE is in the ACTIVE time, and the UE may operate according to a non-DRX mode. However, how to perform the beam failure recovery process in the non-ACTIVE time is also a problem to be solved.

SUMMARY OF INVENTION

The objective of the present invention is to provide a link evaluation method in user equipment (UE) that allows performance of link quality measurement to assist in beam failure detection while achieving energy saving in a DRX mode, and user equipment.

According to a first aspect of the present invention, a user equipment is provided, comprising: an evaluating unit configured to evaluate a link quality; and a notifying unit configured to notify a Beam Failure Instance (BFI) indication to a higher layer when the link quality is worse than a threshold, wherein when a Discontinuous Reception (DRX) is not used, the BFI indication is notified at an interval equaling to a duration of a first indication periodicity, and when the DRX is used, the BFI indication is notified at an interval equaling to a duration of a second indication periodicity.

According to a second aspect of the present invention, a method performed by a user equipment is provided, comprising: evaluating a link quality; and notifying a Beam Failure Instance (BFI) indication to a higher layer when the link quality is worse than a threshold, wherein when a Discontinuous Reception (DRX) is not used, the BFI indication is notified at an interval equaling to a duration of a first indication periodicity, and when the DRX is used, the BFI indication is notified at an interval equaling to a duration of a second indication periodicity.

According to the link evaluation method in user equipment and the user equipment of the present invention, link quality measurement can be performed to assist in beam failure detection while achieving energy saving in a DRX mode.

The above and other features of the present disclosure will become more apparent with the following detailed description in conjunction with the accompanying drawings.

DESCRIPTION OF EMBODIMENTS

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Prior to the specific description, several terms mentioned in the present invention are illustrated as follows. The terms involved in the present invention shall have the meanings set forth below, unless otherwise indicated.

| | | |
|---|---|---|
| UE | User Equipment | user equipment |
| RLF | Radio Link Failure | radio link failure |
| NR | New Radio | new generation radio technology |
| LTE | Long Term Evolution | Long Term Evolution technology |
| eLTE | Enhanced Long Term Evolution | Enhanced Long Term Evolution technology |
| RRC | Radio Resource Control | radio resource control (layer) |
| MAC | Medium Access Control | medium access control (layer) |
| PHY | physical layer | physical layer |
| PDCCH | Physical Downlink Control Channel | physical downlink control channel |
| PUSCH | Physical Uplink Shared Channel | physical uplink shared channel |
| PDSCH | Physical Downlink Shared Channel | physical downlink shared channel |
| RA | Random Access | random access |
| PRACH | Physical Random Access Channel | physical random access channel |
| SSB | Synchronization Signal Block | synchronization signal block |
| CSI-RS | Channel State Information Reference signal | channel state information reference signal |
| MAC CE | MAC Control Element | MAC layer control information |
| RAR | Random Access Response | random access response |
| HARQ | Hybrid Automatic Repeat Quest | hybrid automatic repeat request |
| ACTIVE time | active time | |
| Non-ACTIVE time | non-active time | |

Multiple embodiments according to the present invention are specifically described below, with an NR mobile communications system and its subsequent evolved version serving as exemplary application environments, and with a base station and UE equipment that support NR serving as examples. However, it should be noted that the present invention is not limited to the following embodiments, but is applicable to more other wireless communications systems, such as an eLTE communications system, and is applicable to other base stations and UE devices, such as base stations and UE devices supporting eLTE.

When the UE measures a link and evaluates link quality, specific operations include: measuring a reference signal in a period of time, a measurement result reflecting the strength of the reference signal, and judging whether the strength of the reference signal is higher/lower than a preconfigured threshold. This period of time for measuring the reference signal may be referred to as an evaluation period, or may be referred to as a measurement period, namely, time for performing measurement/evaluation, which will not be described again hereinafter. The length unit of the evaluation period may be milliseconds or the number of slots, or may be the number of subframes. If the reference signal does not appear continuously, but appears periodically, the length of the evaluation period may also be described as the number of reference signal periods contained.

In the evaluation period or measurement period, the UE periodically receives the reference signal, performs sampling and measurement, and then obtains a signal strength value or maps/converts the strength value to a transmission block error rate, that is, obtains a measurement result characterizing the link quality or signal strength through measurement, or obtains the link quality through measurement, which are collectively referred to as the measurement result. It can be seen that energy consumption is caused as the UE receives the reference signal in the evaluation period. After the evaluation is completed, the UE makes judgment according to whether the measurement result of the reference signal is higher/lower than a preconfigured threshold; when the measurement result of the measured reference signal is lower than the threshold, a PHY layer of the UE indicates a BFI to a higher layer to indicate that a BFI is generated; when the strength of the measured reference signal is higher than the threshold, the PHY layer of the UE does not give any indication to the higher layer. This behavior of making judgment according to the measurement result occurs periodically, and the interval thereof may be referred to as an indication periodicity. According to a judgment result, at the boundary of the indication periodicity, if a BFI is generated, the UE may indicate the BFI to the higher layer; if no BFI is generated, the UE does not give any indication.

Since the judgment behavior always occurs at a moment when the evaluation period ends, it may be considered that the UE performs measurement in a period of time before making indication, and then makes indication according to a measurement result. The length of this period of time for measurement is equal to the length of the evaluation period. That is, the UE makes judgment and indication according to a measurement result in this period of time which is the evaluation period prior to indication.

In order to detect a beam failure, the aforementioned measurement needs to be performed, and a common reference signal may be an SSB or a CSI-RS. When it is judged that a beam failure instance occurs, a lower layer, which mainly refers to the PHY layer herein, of the UE indicates a BFI to the higher layer, which mainly refers to a MAC layer. After receiving the BFI, the MAC layer adds 1 to the value of a counter, and starts a timer, beam failure detection timer, corresponding to the indication period. Once the timer times out, it means that one indication period ends, and if a further BFI is indicated at this time, the counter of the MAC layer is further added by 1; if no BFI is indicated, the counter of the MAC layer is reset to zero. When the value of the counter is greater than or equal to a threshold beamFailureInstanceMaxCount+1, a random access procedure is triggered.

In the triggered random access procedure, the UE may send a specific preamble on a contention-free based PRACH resource. If the UE subsequently receives a PDCCH addressed to a C-RNTI of the UE, it may be considered that the random access procedure is successfully completed, and it may be therefore considered that a beam failure recovery process is successfully completed.

In the triggered random access procedure, the UE may further send a preamble on a contention based PRACH resource, and then receive a random access response message (random access response, RAR) sent by a Gnb. The UE sends Message 3 on an uplink resource scheduled in the RAR and carries an identity C-RNTI of the UE in Message 3. If the UE subsequently receives a PDCCH addressed to the C-RNTI of the UE, it may be considered that the contention resolution and the random access procedure are successfully completed, and it may be therefore considered that the beam failure recovery process is successfully completed.

The "PDCCH addressed to the C-RNTI of the UE" herein refers to a PDCCH scrambled by the C-RNTI of the UE, and may be referred to as a PDCCH addressed to the C-RNTI.

The DRX mode herein refers to that the UE is configured with a DRX function or configured with a DRX-related parameter, or that the UE performs a DRX operation. The non-DRX mode herein refers to that the UE is not configured with a DRX function or not configured with a DRX-related parameter, or that the UE does not perform a DRX operation. In the DRX mode, the UE periodically monitors a PDCCH, and the period herein is a DRX cycle. When the UE follows the DRX cycle to wake up and monitor a PDCCH, the UE starts a timer drx-onDurationTimer. When the timer is running, the UE monitors the PDCCH. The "monitoring a PDCCH" herein refers to receiving a PDCCH at all moments when the PDCCH may appear, and detecting whether the PDCCH is scrambled by the C-RNTI of the UE, that is, whether the PDCCH is addressed to the C-RNTI of the UE. If yes, the PDCCH is decoded to acquire information indicated therein.

In the DRX mode, the UE may be in ACTIVE time or non-ACTIVE time. The non-ACTIVE time herein refers to time when the UE is not in the ACTIVE time, or time that does not belong to the ACTIVE time.

When the UE is configured with a DRX cycle, the ACTIVE time refers to the following moments:
- when a timer drx-onDurationTimer, drx-InactivityTimer or drxRetransmissionTimerDL or drx-RetransmissionTimerUL or raContentionResolutionTimer is running;
- when a scheduling request sent on a PUCCH is pending; and
- when a PDCCH addressed to the C-RNTI of the UE is not received after an RAR is successfully received, if a sent preamble is not selected from contention based random access preambles in a random access procedure.

Figure 1:
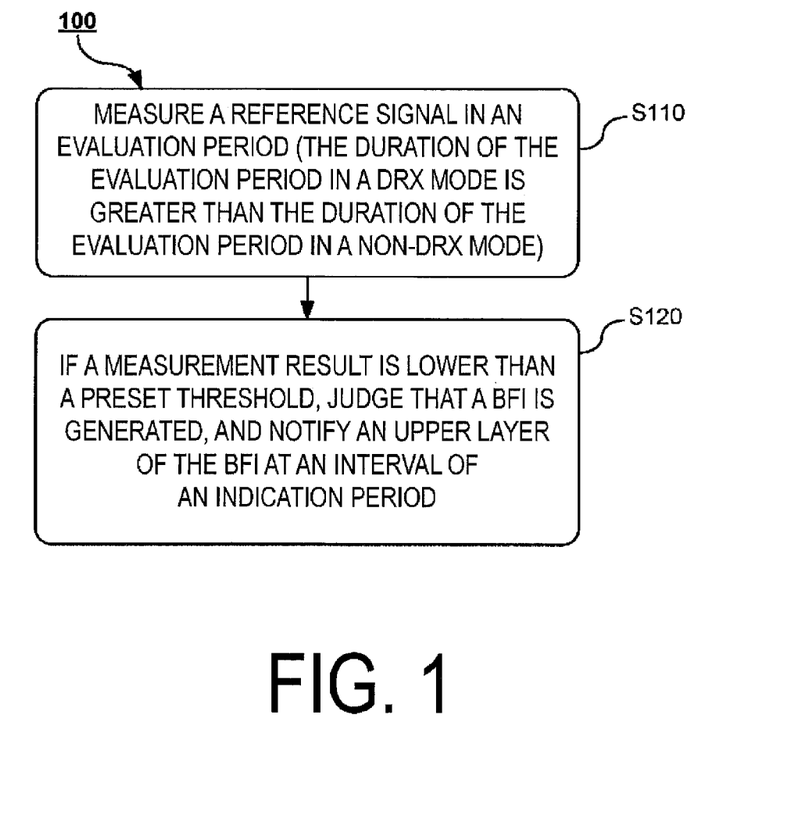
FIG. 1 is a flowchart of a link evaluation method in user equipment according to an embodiment of the present invention.

FIG. 1 is a flowchart of a link evaluation method 100 in user equipment (UE) according to an embodiment of the present invention. In the method, the user equipment (UE) has a DRX mode and a non-DRX mode, and uses different evaluation period duration for beam failure detection in the non-DRX mode and the DRX mode respectively.

Specifically, as shown in FIG. 1, the method 100 includes step S110 and step S120. Step S110: Measure a reference signal (for example, measure the strength of the reference signal) in an evaluation period.

Step S120: In the case that a measurement result (for example, the measured strength of the reference signal or a block error rate mapped to by the strength) is lower than a preset threshold, judge that a beam failure instance (BFI) is generated, and notify a higher layer of the BFI at an interval of an indication period.

Moreover, in the method 100, the duration of the evaluation period when the user equipment is in the non-DRX mode is set to first duration, the duration of the evaluation period when the user equipment is in the DRX mode is set to second duration, and the second duration is greater than the first duration. That is, in the method 100, the duration of the evaluation period in the DRX mode is greater than the duration of the evaluation period in the non-DRX mode.

According to the method 100, an implementation manner for beam failure detection in the DRX mode is provided. The duration of the evaluation period in the DRX mode is greater than the duration of the evaluation period in the non-DRX mode, so that the number of measurements for a reference signal in unit time in the DRX mode is reduced. For example, in the case that the duration of the evaluation period in the DRX mode is two times the duration of the evaluation period in the non-DRX mode, the number of measurements for a reference signal in unit time in the DRX mode is reduced to half the number of measurements for a reference signal in unit time in the non-DRX mode, thereby achieving energy saving.

Therefore, according to the method 100, link quality measurement can be performed to assist in beam failure detection while achieving energy saving in a DRX mode, so as to solve the problem of how to perform link quality measurement to assist in beam failure detection while achieving energy saving in a DRX mode. That is, a link evaluation method in user equipment (UE) that allows performance of link quality measurement to assist in beam failure detection while achieving energy saving in a DRX mode can be provided.

Figure 2:
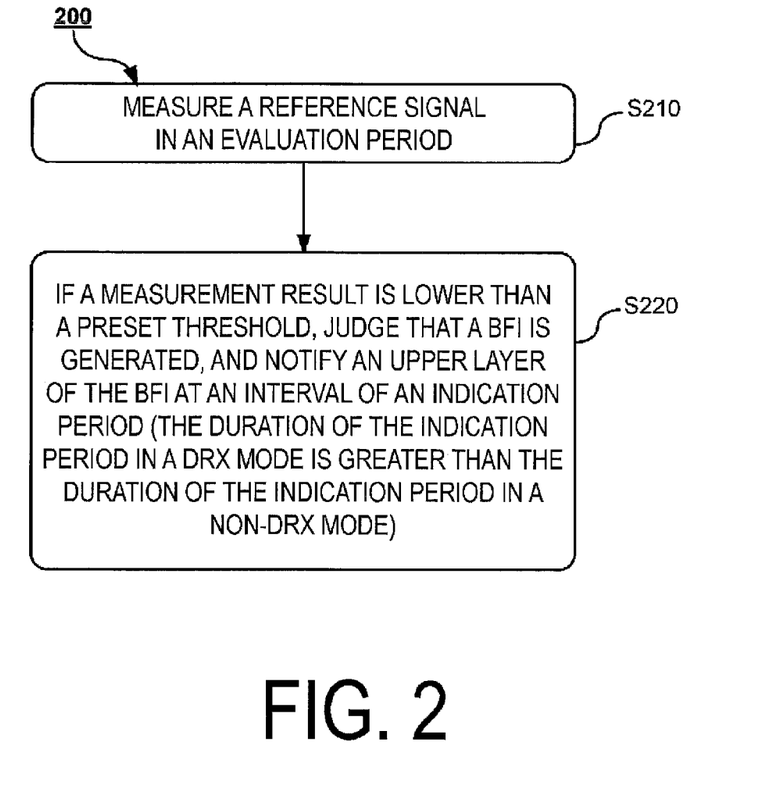
FIG. 2 is a flowchart of another link evaluation method in user equipment according to an embodiment of the present invention.

FIG. 2 is a flowchart of a link evaluation method 200 in user equipment (UE) according to an embodiment of the present invention. In the method, the user equipment (UE) has a DRX mode and a non-DRX mode, and uses different indication period duration in the non-DRX mode and the DRX mode respectively.

Specifically, as shown in FIG. 2, the method 200 includes step S210 and step S220.

Step S210: Measure a reference signal (for example, measure the strength of the reference signal) in an evaluation period.

Step S220: In the case that a measurement result (for example, the measured strength of the reference signal or a block error rate mapped to by the strength) is lower than a preset threshold, judge that a beam failure instance (BFI) is generated, and notify a higher layer of the BFI at an interval equals to the duration of an indication periodicity.

Moreover, in the method 200, the duration of the indication periodicity when the user equipment is in the non-DRX mode is set to third duration, the duration of the indication periodicity when the user equipment is in the DRX mode is set to fourth duration, and the fourth duration is greater than the third duration. That is, in the method 200, the duration of the indication periodicity in the DRX mode is greater than the duration of the indication periodicity in the non-DRX mode.

According to the method 200, an implementation manner for beam failure detection in the DRX mode is provided. The duration of the indication periodicity in the DRX mode is greater than the duration of the indication periodicity in the non-DRX mode, so that the number of notifications for a BFI in unit time in the DRX mode is reduced. For example, in the case that the duration of the indication periodicity in the DRX mode is two times the duration of the indication periodicity in the non-DRX mode, the number of notifications for a BFI in unit time in the DRX mode is reduced to half the number of notifications for a BFI in unit time in the non-DRX mode, thereby achieving energy saving.

Therefore, according to the method 200, link quality measurement can be performed to assist in beam failure detection while achieving energy saving in a DRX mode, so as to solve the problem of how to perform link quality measurement to assist in beam failure detection while achieving energy saving in a DRX mode. That is, a link evaluation method in user equipment (UE) that allows performance of link quality measurement to assist in beam failure detection while achieving energy saving in a DRX mode can be provided.

Several embodiments of the present invention are described in detail below.

Embodiment 1

In a non-DRX mode and a DRX mode, UE uses different evaluation period duration for beam failure detection respectively. Preferably, the duration of the evaluation period used by the UE in the DRX mode is greater than the duration of the evaluation period used in the non-DRX mode. Since the duration of the evaluation period is a product of a sampling time interval and the number of samplings, in the case that measurement of a reference signal requires the same number of samplings in the aforementioned two modes, the sampling time interval of the UE is lengthened by prolonging the evaluation period. Then, in the same amount of time, the number of samplings of the UE is reduced, and accordingly, energy consumed by the sampling action is reduced, thereby achieving the purpose of energy saving.

The specific implementation may be as follows:

in link quality measurement/evaluation for detecting a beam failure, when the UE enters/remains in the non-DRX mode, the evaluation period used is a first evaluation period; when the UE enters/remains in the DRX mode, the evaluation period used is a second evaluation period. In order to achieve an energy saving effect, the length of the second evaluation period should not be less than or equal to the first evaluation period.

The value of the first evaluation period may be pre-configured (pre-defined) or specified by a network side, or the UE may be notified of the value of the first evaluation period through dedicated signaling or system information.

The value of the second evaluation period may be pre-configured (pre-defined) or specified by the network side, or the UE may be notified of the value of the second evaluation period through dedicated signaling or system information.

The value of the second evaluation period may also be determined in other manners. For example, the value of the second evaluation period may be determined according to the first evaluation period and/or a DRX cycle and/or a reference signal period for beam failure detection. Optional manners are as follows:

the second evaluation period may be equal to Factor 1 multiplied by the first evaluation period; or the second evaluation period may be equal to Factor 2 multiplied by the DRX cycle; or the second evaluation period may be equal to Factor 3 multiplied by the reference signal period for beam failure detection;

or the second evaluation period may be equal to a minimum or maximum of Factor 1 multiplied by the first evaluation period and Factor 2 multiplied by the DRX cycle; or the second evaluation period may be equal to a minimum or maximum of Factor 1 multiplied by the first evaluation period and Factor 3 multiplied by the reference signal period for beam failure detection; or the second evaluation period may be equal to a minimum or maximum of Factor 2 multiplied by the DRX cycle and Factor 3 multiplied by the reference signal period for beam failure detection; or the second evaluation period may also be equal to a minimum or maximum of Factor 1 multiplied by the first evaluation period, Factor 2 multiplied by the DRX cycle, and Factor 3 multiplied by the reference signal period for beam failure detection.

Factor 1, Factor 2, and Factor 3 may be integers or fractions greater than or equal to zero. For example, Factor 1 is equal to 1, Factor 2 is equal to 2, Factor 3 is equal to 1, and so on. Factors 1, 2, and 3 may be preset or a user is notified of the factors by the network side through signaling. That is, once the user receives signaling containing Factor 1 and/or Factor 2 or Factor 3, the values of Factor 1, Factor 2, and Factor 3 can be determined.

For another example, in determination of the second evaluation period, judgment may be made based on the length of the DRX cycle first. The network side may set a first threshold.

When the DRX cycle does not exceed or is less than the first threshold, the value of the second evaluation period is equal to the value of the first evaluation period;

when the DRX cycle is not lower than or is greater than the first threshold, the second evaluation period may be determined according to the first evaluation period and/or the DRX cycle and/or the reference signal period for beam failure detection as described earlier.

Embodiment 2

UE uses different indication periodicities to indicate a beam failure instance in a DRX mode and a non-DRX mode. Preferably, the duration of the indication periodicity used by the UE in the DRX mode is greater than the duration of the indication period used in the non-DRX mode. Since the UE always performs measurement in a period of time prior to indication, the longer the indication period, the smaller the number of measurements in the same amount of time, thereby achieving an energy saving effect.

The specific implementation may be as follows:

in link quality measurement/evaluation for detecting a beam failure, when the UE enters/remains in the non-DRX mode, the indication period used is a first indication period; when the UE enters/remains in the DRX mode, the indication period used is a second indication period. In order to achieve an energy saving effect, the length of the second indication period should not be less than or equal to the first indication period.

An implementation manner of the method is as follows:

in the non-DRX mode, the duration of indication periodicity may be equal to a maximum of Factor 1 multiplied by a reference signal period for beam failure detection and Factor 2 multiplied by duration of a beam failure detection timer, and may be expressed mathematically as:

duration of indication periodicity=Max{Factor 1×reference signal period, Factor 2×duration of beam failure detection timer};

In the DRX mode, the duration of indication periodicity may be equal to a maximum of Factor 1 multiplied by a reference signal period for beam failure detection, Factor 2 multiplied by duration of a beam failure detection timer, and Factor 3 multiplied by a DRX cycle, and may be expressed mathematically as:

Duration of indication periodicity=Max{Factor 1×reference signal periodicity, Factor 2×duration of beam failure detection timer, Factor 3×DRX cycle}.

Another implementation manner of the method is as follows:

the duration of indication periodicity may be equal to a maximum of Factor 1 multiplied by a reference signal periodicity for beam failure detection, Factor 2 multiplied by duration of a beam failure detection timer, and Factor 3 multiplied by a DRX cycle, and may be expressed mathematically as:

duration of indication periodicity=Max{Factor 1×reference signal periodicity, Factor 2×duration of beam failure detection timer, Factor 3×DRX cycle}, where the DRX cycle is equal to zero when the UE is in the non-DRX mode, where Factor 1, Factor 2, and Factor 3 may be integers or fractions greater than or equal to zero. For example, Factor 1 may be equal to 1, Factor 2 may be equal to 0 or 1, Factor 3 may be equal to 2, and so on. Preferably, the factors may be constants pre-configured by a network side, or the UE may be notified of the values of the factors by the network side through signaling.

A further implementation manner of the method may be as follows:

the length of the indication period may be directly equal to the duration of the beam failure detection timer. In this manner, the UE only needs to determine the duration of the beam failure detection timer to obtain the length of the indication period which is equal to the duration of the beam failure detection timer. When the UE uses different duration of the beam failure detection timer in the non-DRX mode and the DRX mode, it can be realized that the UE uses different indication periods in the non-DRX mode and the DRX mode.

In the aforementioned implementation manners, the reference signal period, the beam failure detection timer, and the DRX cycle may all be provided by the network side during information configuration. For the beam failure detection timer, preferably, the UE may use different duration in the non-DRX mode and the DRX mode. A method is provided herein to determine the duration of the beam failure detection timer used by the UE in the non-DRX mode and the DRX mode. The specific determining method is as follows:

Manner 1: Configuration information related to the duration of the beam failure detection timer may be carried in configuration related to a beam failure that is received by the UE and sent by the network side. The configuration information carries that the duration of the beam failure detection timer for the non-DRX mode is third duration; the configuration information further carries that the duration of the beam failure detection timer for the DRX mode is fourth duration. After receiving the aforementioned configuration, the UE starts, depending on a mode thereof, the beam failure detection timer to use the third or fourth duration. That is, when the UE is in the non-DRX mode, the third duration is used when the beam failure detection timer is started; when the UE is in the DRX mode, the fourth duration is used when the beam failure detection timer is started.

Manner 2: Configuration information related to the duration of the beam failure detection timer may be carried in configuration related to a beam failure that is received by the UE and sent by the network side. The configuration information carries that the duration of the beam failure detection timer is third duration, or the configuration information may carry a parameter related to beam failure detection and having a value of the third duration, or the configuration information may carry a parameter related to the duration of the beam failure detection timer and having a value of the third duration; or the configuration information may carry a parameter for determining the duration of the beam failure detection timer and having a value of the third duration. The UE receives the configuration information sent by the network side. When the UE starts the beam failure detection timer, or when the duration of the timer needs to be determined, the UE determines the duration of the beam failure detection timer according to the relationship between the duration multiplied by Factor 1 and the DRX cycle multiplied by Factor 2 that is contained in the received configuration information.

For example, the duration contained in the configuration information received by the UE is the third duration, then it may be understood or interpreted that when the beam failure detection timer is started, or when the duration of the beam failure detection timer needs to be determined, the third duration is multiplied by Factor 1 and then compared with the DRX cycle multiplied by Factor 2, and a larger value is taken as the value of the duration of the timer and may be expressed mathematically as:

duration of beam failure detection timer=max{third duration×Factor 1, DRX cycle×Factor 2}, where the DRX cycle is equal to zero when the UE is in the non-DRX mode.

In this method, only one duration needs to be configured, and then the UE determines the value of the duration of the beam failure detection timer based on the length of the DRX cycle. Since the value of the DRX cycle is zero when the UE is in the non-DRX mode or is not configured with DRX function characteristics or relevant parameters, the duration of the beam failure detection timer determined according to the aforementioned method is always equal to the third duration multiplied by Factor 1; the value of the DRX cycle may be configured as fourth duration when the UE is in the DRX mode or configured with DRX function characteristics or relevant parameters;

if the fourth duration multiplied by Factor 2 is greater than the third duration multiplied by Factor 1, the duration of the beam failure detection timer is equal to the fourth duration multiplied by Factor 2, namely, DRX cycle×Factor 2;

if the fourth duration multiplied by Factor 2 is less than the third duration multiplied by Factor 1, the duration of the beam failure detection timer is equal to the third duration multiplied by Factor 1;

if the fourth duration multiplied by Factor 2 is equal to the third duration multiplied by Factor 1, the duration of the beam failure detection timer is equal to the fourth duration multiplied by Factor 2 or the third duration multiplied by Factor 1.

The foregoing description may be expressed mathematically as the duration of beam failure detection timer=max{third duration×Factor 1, DRX cycle×Factor 2}.

Factor 1 and Factor 2 may be integers or fractions greater than or equal to zero. For example, Factor 1 is equal to 1 and Factor 2 is equal to 1; or Factor 1 is equal to 1 and Factor 2 is equal to 0.8, and so on. Preferably, Factor 1 and Factor 2 may be constants pre-defined by the network side, or the UE may be notified of the factors by the network side through signaling.

Manner 3: configuration information related to the duration of the beam failure detection timer may be carried in configuration related to a beam failure that is received by the UE and sent by the network side. The configuration information carries that the duration of the beam failure detection timer is third duration. The UE receives the configuration information sent by the network side. When the UE is in the non-DRX mode or not configured with a DRX function or a DRX-related parameter, when the UE starts the beam failure detection timer, the third duration, namely, the duration of the beam failure detection timer carried in the received configuration information, is used; when the UE is in the DRX mode or configured with a DRX function or a DRX-related parameter, when the UE starts the beam failure detection timer, the fourth duration is used. The fourth duration may be determined by the UE according to the third duration and/or the DRX cycle and/or the reference signal period for beam failure detection. The specific implementation manner may be as follows:

the fourth duration may be equal to Factor 1 multiplied by the third duration; or the fourth duration may be equal to Factor 2 multiplied by the DRX cycle; or the fourth duration may be equal to Factor 3 multiplied by the reference signal period for beam failure detection; or the fourth duration may be equal to a minimum or maximum of Factor 1 multiplied by the third duration and Factor 2 multiplied by the DRX cycle; or the fourth duration may be equal to a minimum or maximum of Factor 1 multiplied by the third duration and Factor 3 multiplied by the reference signal period for beam failure detection; or the fourth duration may be equal to a minimum or maximum of Factor 2 multiplied by the DRX cycle and Factor 3 multiplied by the reference signal period for beam failure detection; or the fourth duration may also be equal to a minimum or maximum of Factor 1 multiplied by the third duration, Factor 2 multiplied by the DRX cycle, and Factor 3 multiplied by the reference signal period for beam failure detection.

Factor 1, Factor 2, and Factor 3 may be integers or fractions greater than or equal to zero. Preferably, Factor 1, Factor 2, and Factor 3 may be constants pre-configured by a network side, or the UE may be notified of the factors by the network side through signaling.

The value of the fourth duration may also be determined in other manners. For example, in determination of the fourth duration, the relationship between the length of the DRX cycle and a first threshold set by the network side is judged first. Preferably, the first threshold may be equal to the value of the third duration.

When the DRX cycle does not exceed or is less than the first threshold, the fourth duration is equal to the third duration;

when the DRX cycle is not lower than or is greater than the first threshold, the fourth duration may be determined according to parameters such as the third duration and/or the DRX cycle and/or the reference signal period for beam failure detection as described above.

In addition to setting the first threshold, the network side may further set a second threshold (the second threshold is greater than the first threshold).

When the DRC cycle is between the first threshold and the second threshold (first threshold<DRC cycle<second threshold; first threshold<=DRC cycle<second threshold; first threshold<=DRC cycle<=second threshold; first threshold<DRC cycle<=second threshold), the fourth duration may be determined according to the third duration and/or the DRX cycle as described above.

When the DRX cycle is not lower than or is greater than the second threshold, the fourth duration is equal to zero or a constant or a value determined based on the DRX cycle. The fourth duration being equal to zero herein may be understood as the UE not indicating a BFI to a higher layer, or may be understood as not performing link quality evaluation/measurement, or stopping/suspending link quality evaluation/measurement. That is, when the DRX cycle is not lower than or is greater than the second threshold, link quality evaluation/measurement is not performed, or link quality evaluation/measurement is stopped/suspended.

It should be noted that the unit of the third duration may be different from the unit of the DRX cycle. For example, the unit of the third duration may be the number of reference signal periods. Assuming that the reference signal period is 5 milliseconds, when the value of the third duration is 4, the real length of the third duration is 4 (periods)×5 (milliseconds/period)=20 (milliseconds).

However, the period of the DRX cycle may be in the unit of subframes. Assuming the length of each subframe is 1 millisecond, when the value of the DRX cycle is 5, the real length of the DRX cycle is 5 (subframes)×1 (millisecond/subframe)=5 milliseconds.

In this case, the fourth duration being equal to a maximum or minimum of Factor 1 multiplied by the DRX cycle and Factor 2 multiplied by the third duration as described earlier refers to converting the DRX cycle and the third duration into a uniform unit, for example, both in the unit of subframes or milliseconds or the number of reference signal periods or the like, and then taking a maximum or minimum.

Manner 4: The UE side has two timers: a first beam failure detection timer and a second beam failure detection timer. The UE receives configuration for duration of the first and second beam failure detection timers. The duration of the first beam failure detection timer is configured as third duration; the duration of the second beam failure detection timer is configured as fourth duration.

When the UE is in the non-DRX mode, if a BFI indication is received, the first beam failure detection timer is started; when the UE is in the DRX mode, if a BFI indication is received, the second beam failure detection timer is started.

A further implementation method of the aforementioned scheme may be that the third duration may be acquired by the UE from configuration information, that is, the configuration information sent by the network side to the UE contains the third duration of the beam failure detection timer for the non-DRX mode; while the fourth duration may be configured by the network side or determined according to the method described earlier.

According to the aforementioned manners, the UE can determine the duration used by the beam failure detection timer in the DRX mode and the non-DRX mode, and then can determine the duration of the indication period. In these manners, since the duration used by the beam failure detection timer is based on the mode of the UE, that is, determined according to whether the UE is in the DRX mode or the non-DRX mode, the length of the indication period is also indirectly related to whether the UE is in the DRX mode or the non-DRX mode. It may be considered that in the aforementioned manners, the duration of the indication period used by the UE in the DRX mode is different from the duration of the indication period used by the UE in the non-DRX mode, and preferably, the indication period used by the UE in the DRX mode is greater than the indication period used by the UE in the non-DRX mode.

Embodiment 3

Embodiments 1 and 2 may be used alone or in combination. That is, by means of the methods in Embodiments 1 and 2, UE uses different evaluation period duration for beam failure detection and uses different indication periods to indicate a beam failure instance in a non-DRX mode and a DRX mode respectively.

Embodiment 4

When UE remains in/enters a DRX mode, or the UE is configured with a DRX function, the UE may be in ACTIVE time and non-ACTIVE time. An energy saving method may also be that the UE may use different evaluation period duration for beam failure detection in the ACTIVE time and the non-ACTIVE time respectively; the method may also be that the UE uses different indication periods to indicate a beam failure instance respectively; the method may also be that the UE uses different evaluation period duration for beam failure detection and uses different indication periods to indicate a beam failure instance respectively.

The evaluation period and indication period used by the UE in the ACTIVE time may be equal to the evaluation period and the indication period in the non-DRX mode; it may be considered that the evaluation period used by the UE in the ACTIVE time is equal to the first evaluation period; the indication period used by the UE in the ACTIVE time is equal to the first duration.

While the UE is in the non-ACTIVE time, the evaluation period and indication period used for detecting a beam failure may have different values from those in the ACTIVE time. It may be considered that the evaluation period used by the UE in the non-ACTIVE time is equal to the second evaluation period; the indication period used by the UE in the non-ACTIVE time is equal to the second duration.

The methods for determining the first evaluation period, the second evaluation period, the first duration, and the second duration are the same as those in Embodiments 1 and 2.

Embodiment 5

UE instructs a PHY layer to start/perform/activate link quality measurement/evaluation for detecting a beam failure;

the PHY layer receives the instruction from a higher layer, and if it is instructed to perform/activate link quality measurement/evaluation for detecting a beam failure, link quality measurement/evaluation for detecting a beam failure is performed/activated.

Such method may also be described as that in the DRX mode, the PHY layer performs/activates link quality measurement/evaluation for detecting a beam failure only when receiving the instruction from the higher layer on performing/activating link quality measurement/evaluation for detecting a beam failure.

Preferably, the PHY layer does not need to start the measurement immediately at a moment of receiving the instruction, but instead waits for a pre-configured period of time to start the measurement. In this period of time, the UE may not start/not perform the measurement/evaluation.

Embodiment 6

UE instructs a PHY layer to not perform/deactivate/stop link quality measurement/evaluation for detecting a beam failure, or the UE instructs a lower layer to not report a beam failure instance.

The PHY receives the instruction from a higher layer, and if it is instructed to stop/not perform/deactivate/stop link quality measurement/evaluation for detecting a beam failure, or it is instructed to not report a beam failure instance, link quality measurement/evaluation for detecting a beam failure is stopped/not performed/deactivated/stopped.

Preferably, the PHY layer does not need to stop the measurement immediately after receiving the instruction, but instead waits for a pre-configured period of time to stop the measurement. In this period of time, the UE may continue performing the measurement/evaluation.

Embodiment 7

Embodiment 5 and Embodiment 6 may be implemented separately or in combination. That is, by means of the methods in Embodiments 5 and 6, in a DRX mode, or when UE is configured with a DRX function, the UE may instruct a PHY layer to start/perform/activate link quality measurement/evaluation for detecting a beam failure according to needs; and the UE instructs the PHY layer to stop/not perform/deactivate/stop link quality measurement/evaluation for detecting a beam failure.

Embodiment 8

The methods in Embodiments 5, 6, and 7 may be judged and performed based on needs of UE. For example, when the UE enters/remains in ACTIVE time, it may be considered that the UE needs to send and receive data through a link; then in this case, in order to provide reliable link quality, the UE needs to perform link quality measurement/evaluation for detecting a beam failure. Therefore, the UE may instruct a PHY layer to start/perform/activate link quality measurement/evaluation for detecting a beam failure. Preferably, the UE may enter the ACTIVE time at a moment X, while the UE instructs to start/perform/activate link quality measurement/evaluation for detecting a beam failure at a moment X-Y. That is, the instruction is made earlier than the moment X by duration of Y. The specific implementation manner may be that before a drx-onDurationTimer is started, starting of the measurement is instructed, and may be that if the drx-onDurationTimer is started at the moment X, instruction is made at the moment X-Y. Y may be equal to the duration of one evaluation period described earlier.

When the UE enters/remains in non-ACTIVE time, it may be considered that the UE will sleep and have low requirements for link quality. Thus, in order to save energy, the PHY layer may be instructed to stop/not perform/deactivate/stop link quality measurement/evaluation for detecting a beam failure. Preferably, if a MAC entity is not in the ACTIVE time at the moment X, the beam failure detection process may not be performed. The specific implementation manner of "skipping performing the beam failure detection process" herein may be as follows:

the UE instructs a lower layer, which may refer to the PHY layer herein, to stop/not perform/deactivate/stop link quality measurement/evaluation for detecting a beam failure; or the UE sends to the lower layer an instruction on stopping beam failure-related detection; or the UE instructs the lower layer to not report a beam failure instance, and so on.

After receiving the aforementioned instruction, the PHY layer may immediately stop link quality measurement/evaluation for detecting a beam failure, and may also wait till a moment X+Z to stop relevant measurement/evaluation. The UE may continue the measurement/evaluation in the period between the moment X and the moment X+Z.

When the number of BFIs received by a higher layer of the UE is greater than or equal to beamFailureInstanceMaxCount+1, the UE triggers a random access procedure. In the random access procedure, the UE sends a preamble for a beam failure recovery request. After the preamble is sent, if the UE receives a PDCCH scrambled by a C-RNTI of the UE, it may be considered that the random access procedure is successfully completed. Further, the UE considers that a beam failure recovery process is successfully completed.

Herein, the PDCCH received by the UE may indicate an uplink transmission/scheduling (UL transmission/UL grant), or indicate a downlink transmission/assignment (DL transmission/DL assignment) on a PDSCH.

Since a moment at which the beam failure recovery triggers an RA is only related to the number of reported BFIs, the triggered RA may occur in the ACTIVE time or non-ACTIVE time. Therefore, the aforementioned PDCCH marking successful completion of the RA and successful completion of the beam failure recovery may be received in the ACTIVE time or non-ACTIVE time.

In the existing mechanism, a corresponding behavior is defined for reception of a PDCCH that indicates an uplink scheduling or downlink transmission when the MAC entity is in the ACTIVE time. However, how to process a PDCCH that indicates an uplink scheduling or downlink transmission received by UE in the non-ACTIVE time is a problem that needs to be solved.

Embodiment 9

In order to solve the aforementioned problem, one method is to add a definition for ACTIVE time so that UE is in the ACTIVE time when receiving the aforementioned PDCCH so as to employ the behavior specified in the existing mechanism. The specific implementation manner of the method may be as follows:

when the UE is configured with a DRX cycle, once a beam failure recovery process is triggered, time from that moment is included in the ACTIVE time. That is, once the beam failure recovery is triggered, the UE determines that a MAC entity enters/remains in the ACTIVE time; or when the UE is configured with a DRX cycle, time during which a random access procedure triggered by beam failure recovery is performed is included in the ACTIVE time; or when the UE is configured with a DRX cycle, time during which a beam failure recovery process is performed is included in the ACTIVE time; or when the UE is configured with a DRX cycle, when the UE sends a preamble on a contention-free based (based on contention free) PRACH resource, time from that moment is included in the ACTIVE time; that is, once a preamble is sent on a contention-free based PRACH resource, the UE determines that the MAC entity enters/remains in the ACTIVE time; that is, this period of time is included in the ACTIVE time; or when the UE is configured with a DRX cycle, when a random access response is successfully received but a PDCCH addressed to a C-RNTI of the UE is not yet received in a random access procedure triggered by beam failure recovery, from that moment on, the UE determines that the MAC entity enters/remains in the ACTIVE time; that is, this period of time is included in the ACTIVE time; or when the UE is configured with a DRX cycle, when a random access response is successfully received but a PDCCH addressed to a C-RNTI of the UE is not yet received in a random access procedure triggered by beam failure recovery, from that moment on, the UE determines that the MAC entity enters/remains in the ACTIVE time; that is, this period of time is included in the ACTIVE time; or when the UE is configured with a DRX cycle, if a sent preamble is selected from contention based random access preambles in a random access procedure, when a PDCCH addressed to a C-RNTI of the UE is not yet received after an RAR is successfully received, from that moment on, the UE determines that the MAC entity enters/remains in the ACTIVE time; that is, this period of time is included in the ACTIVE time.

Based on the aforementioned method, when the UE receives a PDCCH addressed to the C-RNTI of the UE in a random access procedure triggered by beam failure recovery, it may be determined that the UE enters/remains in the ACTIVE time. During the ACTIVE time, when the aforementioned PDCCH indicates a downlink assignment or uplink scheduling/transmission on a PDSCH, a timer drx-InactivityTimer may be started. When the timer is running, the UE continuously monitors the PDCCH.

Further, during the ACTIVE time, if the aforementioned PDCCH indicates a downlink assignment on a PDSCH, after the corresponding PUCCH transmission is completed, the UE starts a timer drx-HARQ-RTT-TimerDL for the HARQ process. The "corresponding PUCCH transmission" herein refers to that after receiving transmission information on the PDSCH, the UE feeds back ACK/NACK information for the received information to a Gnb through the PUCCH. When the drxHARQ-RTT-TimerDL times out, if downlink data corresponding to the HARQ process related to the current transmission is not correctly received, a timer drxRetransmissionTimerDL is started for the HARQ process. When the drxRetransmissionTimerDL is running, the UE continuously monitors the PDCCH.

Moreover, optionally, during the ACTIVE time, if the aforementioned PDCCH indicates an uplink scheduling/transmission, after the corresponding PUSCH transmission is completed or the first retransmission of the corresponding PUSCH is completed, the UE starts a timer drx-HARQ-RTT-TimerUL for the HARQ process. The "corresponding PUSCH transmission" herein refers to uplink data transmitted by the UE on a PUSCH corresponding to a moment and frequency domain of the uplink scheduling indicated by the PDCCH. If the drx-HARQ-RTT-TimerUL times out, drx-RetransmissionTimerUL is started for the HARQ process related to the current transmission. When the drx-RetransmissionTimerUL is running, the UE continuously monitors the PDCCH.

Figure 3:
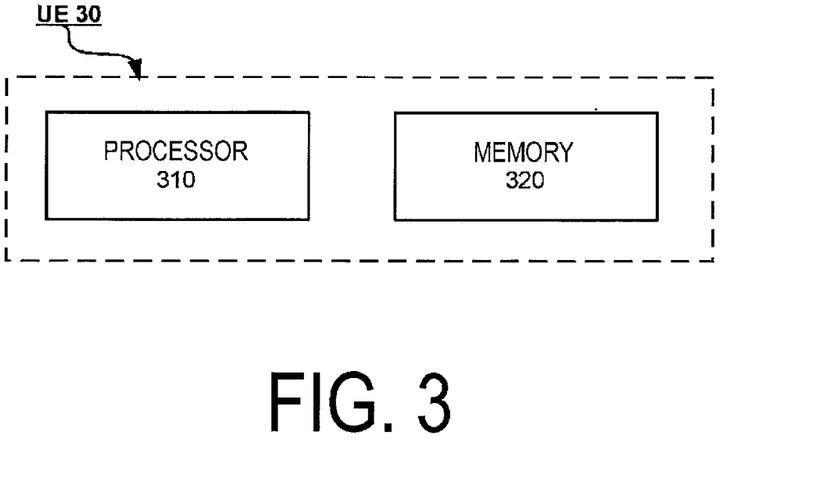
FIG. 3 is a block diagram of user equipment according to an embodiment of the present invention.

FIG. 3 is a block diagram of user equipment 30 according to an embodiment of the present invention. As shown in FIG. 3, the user equipment 30 includes a processor 310 and a memory 320. The processor 310 may, for example, include a microprocessor, a microcontroller, an embedded processor, or the like. The memory 320 may include, for example, a volatile memory (for example, a random access memory (RAM)), a hard disk drive (HDD), a non-volatile memory (for example, a flash memory), or other memories. Program instructions are stored on the memory 320. The instructions, when run by the processor 310, can perform the aforementioned link evaluation method in user equipment described in detail in the present invention.

The program running on the device according to the present invention may be a program that enables the computer to implement the functions of the embodiments of the present invention by controlling a central processing unit (CPU). The program or information processed by the program may be stored temporarily in a volatile memory (for example, a random access memory (RAM)), a hard disk drive (HDD), a nonvolatile memory (for example, a flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multichip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

According to a first aspect of the present invention, a user equipment is provided, comprising: an evaluating unit configured to evaluate a link quality; and a notifying unit configured to notify a Beam Failure Instance (BFI) indication to a higher layer when the link quality is worse than a threshold, wherein when a Discontinuous Reception (DRX) is not used, the BFI indication is notified at an interval equaling to a duration of a first indication periodicity, and when the DRX is used, the BFI indication is notified at an interval equaling to a duration of a second indication periodicity.

In the aforementioned user equipment, it may be that a reference signal used to evaluate the link quality is Synchronization Signal Block (SSB) or Channel State Information Reference signal (CSI-RS).

In the aforementioned user equipment, it may be that a value of the first indication periodicity is determined by a value of a periodicity of the reference signal; a value of the second indication periodicity is a maximum value between (i) a first value obtained by multiplying DRX cycle length by a first factor and (ii) a second value obtained by multiplying the value of the periodicity of the reference signal by a second factor.

According to a second aspect of the present invention, a method performed by a user equipment is provided, comprising: evaluating a link quality; and notifying a Beam Failure Instance (BFI) indication to a higher layer when the link quality is worse than a threshold, wherein when a Discontinuous Reception (DRX) is not used, the BFI indication is notified at an interval equaling to a duration of a first indication periodicity, and when the DRX is used, the BFI indication is notified at an interval equaling to a duration of a second indication periodicity.

In the aforementioned method, it may be that a reference signal used to evaluate the link quality is Synchronization Signal Block (SSB) or Channel State Information Reference signal (CSI-RS).

In the aforementioned method, it may be that a value of the first indication periodicity is determined by a value of a periodicity of the reference signal; a value of the second indication periodicity is a maximum value between (i) a first value obtained by multiplying DRX cycle length by a first factor and (ii) a second value obtained by multiplying the value of the periodicity of the reference signal by a second factor.

According to a third aspect of the present invention, a link evaluation method in user equipment is provided, the user equipment having a discontinuous reception (DRX) mode and a non-DRX mode, the link evaluation method comprising: measuring a reference signal in an evaluation period; and in the case that a measurement result is lower than a preset threshold, judging that a beam failure instance (BFI) is generated, and notifying an higher layer of the BFI at an interval of an indication period, wherein when the user equipment is in the non-DRX mode, the duration of the evaluation period is first duration; when the user equipment is in the DRX mode, the duration of the evaluation period is second duration; and the second duration is greater than the first duration.

In the aforementioned link evaluation method, it may be that the first duration is preconfigured by a network side, or a notice about the first duration is issued by the network side through dedicated signaling or system information, and the second duration is pre-configured by the network side, or a notice about the second duration is issued by the network side through dedicated signaling or system information, or the second duration is determined according to at least any one of the first duration, a DRX cycle, and a reference signal period for beam failure detection.

In the aforementioned link evaluation method, it may be that in the DRX mode, the evaluation period in a non-active state is greater than the evaluation period in an active state.

According to a forth aspect of the present invention, a link evaluation method in user equipment is provided, the user equipment having a discontinuous reception (DRX) mode and a non-DRX mode, the link evaluation method comprising: measuring a reference signal in an evaluation period; and in the case that a measurement result is lower than a preset threshold, judging that a beam failure instance (BFI) is generated, and notifying an higher layer of the BFI at an interval of an indication period, wherein when the user equipment is in the non-DRX mode, the duration of the indication period is third duration; when the user equipment is in the DRX mode, the duration of the indication period is fourth duration; and the fourth duration is greater than the third duration.

In the aforementioned link evaluation method, it may be that the third duration is preconfigured by a network side, or a notice about the third duration is issued by the network side through dedicated signaling or system information, and the fourth duration is pre-configured by the network side, or a notice about the fourth duration is issued by the network side through dedicated signaling or system information, or the fourth duration is determined according to at least any one of the third duration, a DRX cycle, a reference signal period for beam failure detection, and the duration of a beam failure detection timer.

In the aforementioned link evaluation method, it may be that in the DRX mode, the duration of the indication period in a non-active state is greater than the duration of the indication period in an active state.

In the aforementioned link evaluation method, it may be that in the DRX mode, the user equipment instructs a lower layer to perform or stop the measurement of strength of the reference signal and the notification of the BFI according to needs.

In the aforementioned link evaluation method, it may be that in the DRX mode, the user equipment instructs the lower layer to perform the measurement of the strength of the reference signal and the notification of the BFI in an active state, and instructs the lower layer to stop the measurement of the strength of the reference signal and the notification of the BFI in a non-active state.

In the aforementioned link evaluation method, it may be that in the DRX mode, the user equipment instructs the lower layer to perform the measurement of the strength of the reference signal and the notification of the BFI at a moment before entering an active state.

According to a fifth aspect of the present invention, user equipment is provided, comprising: a processor; and a memory, storing instructions, wherein the instructions, when run by the processor, perform the link evaluation method described above.

The invention claimed is:

1. A user equipment, comprising:
an evaluating unit configured to evaluate a link quality; and
a notifying unit configured to notify a Beam Failure Instance (BFI) indication to a higher layer when the link quality is worse than a threshold, wherein
when a Discontinuous Reception (DRX) is not used, the BFI indication is notified at an interval equaling to a duration of a first indication periodicity,
when the DRX is used, the BFI indication is notified at an interval equaling to a duration of a second indication periodicity, and
the duration of the second indication periodicity is always greater than the duration of the first indication periodicity.

2. The user equipment according to claim 1, wherein
a reference signal used to evaluate the link quality is Synchronization Signal Block (SSB) or Channel State Information Reference signal (CSI-RS).

3. The user equipment according to claim 2, wherein
a value of the first indication periodicity is determined by a value of a periodicity of the reference signal;
a value of the second indication periodicity is a maximum value between (i) a first value obtained by multiplying DRX cycle length by a first factor and (ii) a second value obtained by multiplying the value of the periodicity of the reference signal by a second factor.

4. A method performed by a user equipment, comprising:
evaluating a link quality; and
notifying a Beam Failure Instance (BFI) indication to a higher layer when the link quality is worse than a threshold, wherein
when a Discontinuous Reception (DRX) is not used, the BFI indication is notified at an interval equaling to a duration of a first indication periodicity,
when the DRX is used, the BFI indication is notified at an interval equaling to a duration of a second indication periodicity, and
the duration of the second indication periodicity is always greater than the duration of the first indication periodicity.

5. The method according to claim 4, wherein
a reference signal used to evaluate the link quality is Synchronization Signal Block (SSB) or Channel State Information Reference signal (CSI-RS).

6. The method according to claim 5, wherein
a value of the first indication periodicity is determined by a value of a periodicity of the reference signal;
a value of the second indication periodicity is a maximum value between (i) a first value obtained by multiplying DRX cycle length by a first factor and (ii) a second value obtained by multiplying the value of the periodicity of the reference signal by a second factor.

* * * * *